(12) United States Patent
Rosseel

(10) Patent No.: US 6,626,156 B2
(45) Date of Patent: Sep. 30, 2003

(54) FUEL TANK VALVE AND A TANK FITTED THEREWITH

(75) Inventor: Alexis Rosseel, Compiegne (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/745,531

(22) Filed: Dec. 26, 2000

(65) Prior Publication Data

US 2001/0020487 A1 Sep. 13, 2001

(30) Foreign Application Priority Data

Dec. 23, 1999 (FR) .............................. 99 16353

(51) Int. Cl.⁷ .............................................. F02M 37/04
(52) U.S. Cl. ...................................... 123/516; 123/510
(58) Field of Search .................... 123/516, 510, 123/518, 519; 137/171, 202, 192, 587; 251/63

(56) References Cited

U.S. PATENT DOCUMENTS

| 4,991,615 A | | 2/1991 | Szlaga et al. | |
|---|---|---|---|---|
| 5,036,823 A | | 8/1991 | MacKinnon | |
| 5,054,528 A | * | 10/1991 | Saitoh ........................ | 137/587 |
| 5,197,444 A | * | 3/1993 | Lang et al. ................. | 123/509 |
| 5,253,668 A | * | 10/1993 | Mills ............................ | 137/12 |
| 5,329,164 A | | 7/1994 | Saito | |
| 5,404,907 A | * | 4/1995 | Benjey et al. ............... | 137/587 |
| 5,449,029 A | * | 9/1995 | Harris ......................... | 141/198 |
| 5,579,802 A | * | 12/1996 | Tuckey ....................... | 137/202 |
| 5,590,697 A | | 1/1997 | Benjey et al. | |
| 5,954,082 A | | 9/1999 | Waldorf et al. | |
| 5,960,816 A | | 10/1999 | Mills et al. | |
| 5,992,441 A | | 11/1999 | Enge et al. | |
| 5,996,607 A | | 12/1999 | Bergsma et al. | |
| 6,085,771 A | | 7/2000 | Benjey et al. | |
| 6,145,532 A | * | 11/2000 | Tuckey et al. .............. | 137/202 |
| 6,412,511 B1 | * | 7/2002 | Rosseel ...................... | 137/202 |

FOREIGN PATENT DOCUMENTS

| DE | 3704641 A1 | | 3/1988 |
|---|---|---|---|
| DE | 40 12 368 A1 | | 10/1990 |
| DE | 195 09 889 A1 | | 10/1995 |
| DE | 198 05 071 C1 | | 8/1999 |
| GB | 2288795 | * | 11/1995 |

* cited by examiner

*Primary Examiner*—Mahmoud Gimie
(74) *Attorney, Agent, or Firm*—Oliff & Berridge, PLC

(57) ABSTRACT

A fuel tank valve for connection to a degassing circuit (15), the valve comprising a moving closure member and means (11) capable of being controlled from outside the tank (2) to act on the closure member (10) to bring it into a predetermined position when the vehicle is in a predetermined state, the valve being characterized by the fact that the closure member is suitable for rising by floating on the surface of the fuel.

28 Claims, 3 Drawing Sheets

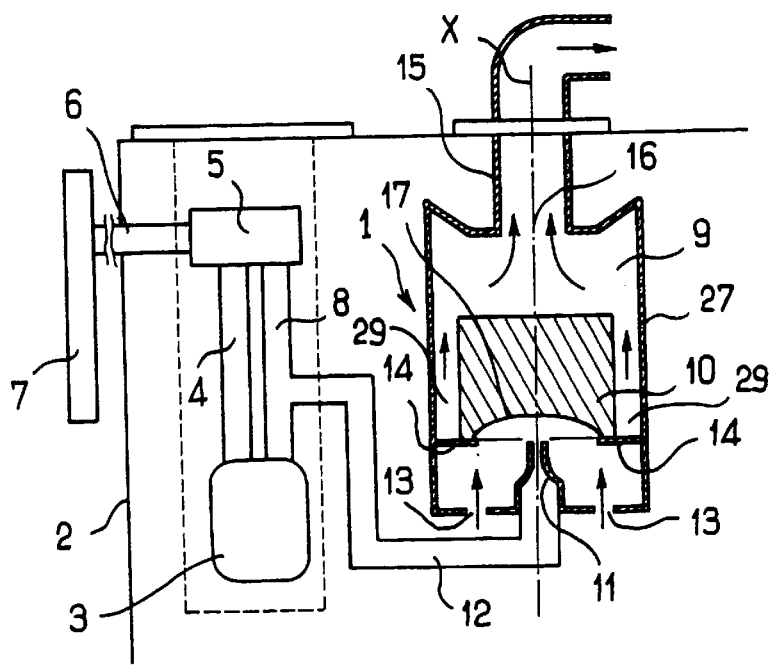
FIG_1
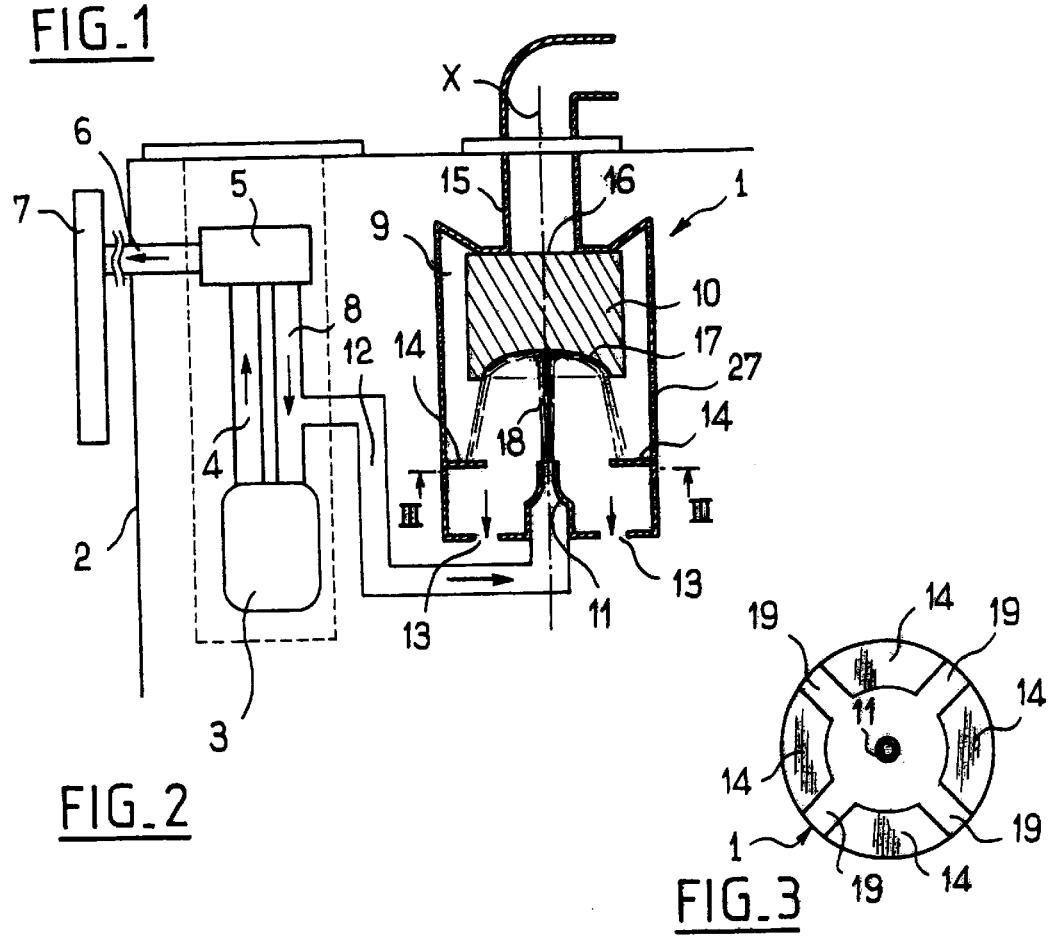
FIG_2
FIG_3

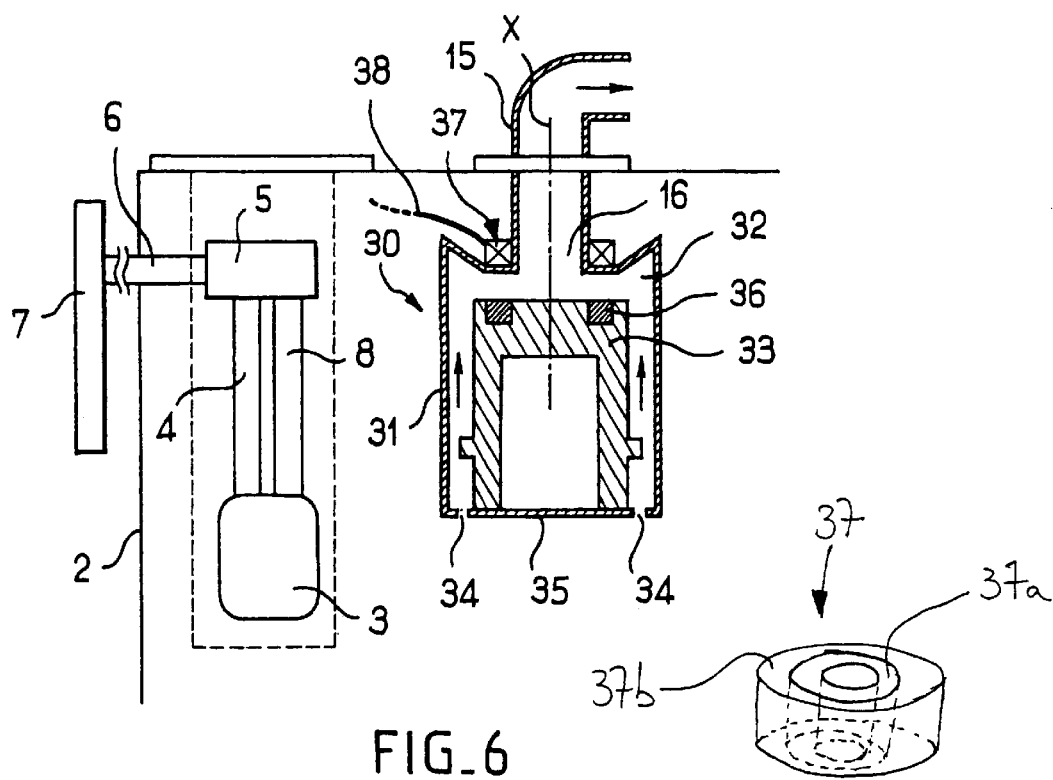
FIG_6
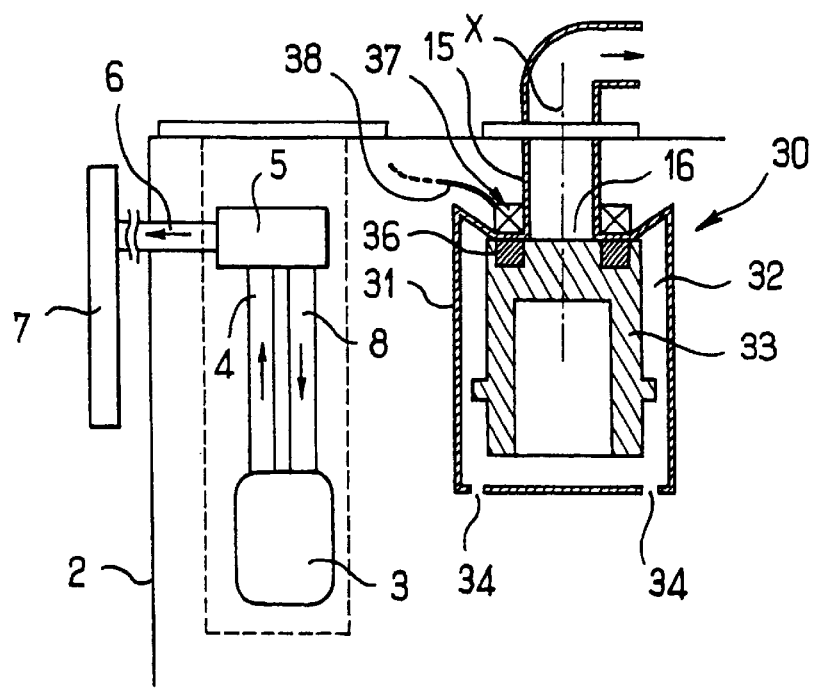
FIG_7

FUEL TANK VALVE AND A TANK FITTED THEREWITH

FIELD OF THE INVENTION

The present invention relates to a valve for a motor vehicle fuel tank for connection to a degassing circuit through which air and fuel vapor contained in the tank escape while the tank is being filled.

The degassing circuit communicates with the atmosphere via an activated carbon filter, also known as a "cannister", for the purpose of preventing fuel vapor being dumped into the atmosphere.

The valve needs to be opened while the tank is being filled so as to avoid impeding the flow of air and fuel vapor to the degassing circuit.

Nevertheless, it is desirable to prevent droplets of fuel being entrained into the degassing circuit while the vehicle is running since they might reach the activated carbon filter which would rapidly become saturated and thus lose its effectiveness.

German patent application DE-195 09 889 describes a motor vehicle tank degassing device for controlling the passage of fuel vapor to a cannister, the valve including a magnetizable element that can be moved under magnetic drive to open or to close the passage to the canister.

German patent application DE-40 12 368 describes a degassing device having a moving magnetizable element suitable for closing the passage to a cannister, with movement of the disk being controlled by means of an electromagnet and a spring.

Each of those two devices also includes a respective floating body that is separate from the magnetizable element and suitable for rising when the level of fuel in the tank rises, thereby closing the passage to the cannister at the end of tank filling.

The above-mentioned devices are relatively complex in structure, and in particular they comprise large numbers of parts.

SUMMARY OF THE INVENTION

A particular object of the present invention is to propose a novel valve which is capable firstly of providing effective ventilation of the tank while it is being filled and secondly of reducing the risk of liquid fuel reaching the degassing circuit while the vehicle is running.

Another object of the invention is to simplify the structure of the valve, in particular by reducing the number of its component parts.

The invention achieves this by the fact that the valve has a moving closure member and means that can be controlled from outside the tank to act on said closure member and bring it into a predetermined position when the vehicle is in a predetermined state, e.g. into a position in which the valve is completely or partially closed while the engine is running, the closure member being suitable for rising by floating on the surface of the fuel.

Advantageously, the means for acting on the closure member bring it into the open position while the tank is being filled.

The closure member can thus have a float function solely while the tank is being filled and the valve is open.

The means for acting on the closure member can advantageously include a coil that is excited by an electric current to exert an electromagnetic force on the closure member, the closure member then being magnetizable.

The coil can be excited electrically at the beginning of filling so as to create a magnetic field tending to cancel the effects of a permanent magnet.

Advantageously, in the absence of electrical excitation of the coil, the permanent magnet is suitable for holding the closure member in a high position for closing the valve.

In a particular embodiment, the closure member has a magnetizable metal part on top, e.g. a magnetizable metal ring, and the valve has a coil wound around a permanent magnet such that when the closure member is in the valve-closing position, the metal part is attracted by the permanent magnet sufficiently to hold the closure member in the closed position even though the coil is carrying no current.

The magnetic attraction of the metal part of the closure member to the permanent magnet can be interrupted when the coil is powered in such a manner as to create a magnetic field opposite to that of the permanent magnet, the closure member then returning under gravity to its open position.

The excitation of the coil which enables a magnetic field to be created that tends to cancel the effects of the permanent magnet at the time of filling can advantageously be caused to come into operation by removal of the filler cap from the tank.

In another implementation of the invention, the means for acting on the closure member make use of the energy of a fuel pump, which pump is advantageously the same as the pump used for delivering fuel to the injectors of the engine.

When the engine is running, the fuel pump delivers fuel at relatively high pressure and the energy thereof is advantageously used for bringing the closure member into the closed position.

When the engine is switched off, this energy ceases to be supplied and the closure member can return to an open position.

The valve can include a nozzle squirting a jet of fuel beneath the closure member, said jet tending to bring it into a valve closure position where it closes access to the degassing circuit.

In a variant, the means for acting on the closure member can comprise a diaphragm suitable for inflating under the effect of fuel being delivered under pressure.

In a preferred embodiment, the closure member is suitable for closing the degassing circuit in the event of the vehicle accidentally rolling over.

The invention also provides a motor vehicle fuel tank fitted with a valve as specified above.

Other characteristics and advantages of the present invention will appear on reading the following detailed description of three non-limiting embodiments of the invention, and on examining the accompanying drawings, in which:

BRIEF DESCRIPTION OF THE DRAWINGS

FIG. 1 is a diagrammatic view of a valve constituting a first embodiment of the invention, while the vehicle is at rest;

FIG. 2 shows the FIG. 1 valve while the engine is running;

FIG. 3 is a view on section line III—III of FIG. 2;

FIG. 6 is a diagrammatic view of a valve forming a third embodiment of the invention, while the vehicle is at rest;

FIG. 7 shows the FIG. 6 valve while the engine is running; and

FIG. 8 is a highly diagrammatic fragmentary view of the permanent magnet and the coil of the valve of FIGS. 6 and 7.

DETAILED DESCRIPTION OF THE INVENTION

Figure 4:
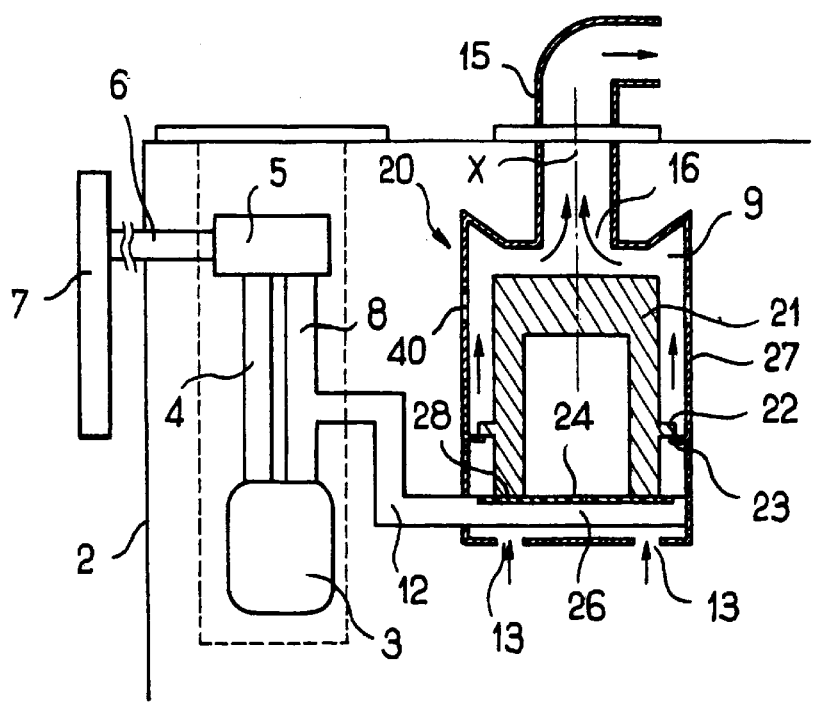
FIG. 4 is a diagrammatic view of a valve constituting a second embodiment of the invention, while the vehicle is at rest.

FIGS. 1 and 2 show a valve 1 constituting a first embodiment of the invention.

The valve 1 is fitted to a fuel tank 2 which is shown in part only in order to clarify the drawing.

A pump 3 shown highly diagrammatically is provided to take fuel from the tank 2 and deliver it to the injectors 7 of the vehicle engine.

A regulator 5 is connected to the pump 3 and to the injectors 7 via respective ducts 4 and 6.

The regulator 5 returns the fuel that is not consumed by the injector 7 to the pump 3 via a duct 8.

The pump 3 together with the regulator 5 and the ducts 4 and 8 constitutes a unit which is inserted as a single piece in the tank 2, and this is represented by dashed lines in FIGS. 1 and 2.

The substantially tubular body of the valve 1 defines a housing 9 that is elongate on an axis X, and a closure member 10 is movable therein along said axis.

When the vehicle is at rest on a horizontal surface, the axis X is substantially vertical.

The closure member 10 is slidably guided by the side wall 27 of the body of the valve 1 by means of guide ribs that are not shown in the drawing.

These ribs co-operate with one another and with the side wall 27 to leave axial passages 29.

A nozzle 11 centered on the axis X opens out substantially in the base of the housing 9 so as to squirt liquid fuel under pressure beneath the closure member 10, which fuel is taken from the duct 8.

The nozzle 11 can be integrally molded with the bottom wall of the body of the valve 1 or it can be implemented by fitting a separate piece.

The pipe connecting the nozzle 11 to the duct 8 is referenced 12 in the drawing.

The housing 9 communicates with the inside of the tank 2 via openings 13 made through the bottom wall of the body of the valve 1, all around the nozzle 11.

Supports 14 are formed level with the outlet orifice of the nozzle 11 to act as a seat for the closure member 10 in the absence of a fuel jet being emitted by the nozzle, as can be seen in FIG. 1.

These supports 14 leave gaps 19 between one another, as can be seen in FIG. 3.

A duct 15 of a conventional degassing circuit (not shown) penetrates in leakproof manner into the tank 2.

This duct 15 communicates with the housing 9 via an orifice 16 centered on the axis X and made in the top wall of the body of the valve 1.

When the vehicle engine is at rest, the pump 3 is not in operation and no jet of fuel leaves the nozzle 11.

The closure member 10 then rests via its bottom face 17 on the supports 14.

Air and fuel vapor present inside the tank can then leave the tank so as to be replaced by liquid fuel during filling, the air and vapor penetrating into the housing 9 of the valve 1 via the openings 13, passing through the gaps 19, and then traveling along the closure member 10 in the axial passages 29 and escaping via the duct 15, which is represented in FIG. 1 by the arrows.

It will be observed that when the closure member 10 is resting on the supports 14, the orifice 16 is thoroughly disengaged thus allowing gas to flow through the valve 1 at a relatively high rate without excessive head loss.

By way of example, the section of the orifice 16 can lie in the range 1.5 square centimeters ($cm^2$) to 2.5 $cm^2$, thus enabling air to flow through the valve 1 at a rate of 6000 liters per minute (l/min) with head loss of less than 10 mbar.

At the end of filling, the closure member 10 can rise by floating on the surface of the fuel, thereby closing the orifice 16 and causing the filler nozzle to trip.

When the engine is running, the pump 3 feeds the duct 4 with fuel under pressure.

The regulator 5 sends a fraction to the injectors 7 and the fraction which is not consumed thereby is returned to the tank 2 via the duct 8.

At least a fraction of the fuel under pressure traveling in the duct 8 leaves via the nozzle 11 to form an upwardly directed jet 18 of fuel on the axis X, which jet strikes the bottom face 17 of the closure member 10 and lifts it, as shown in FIG. 2.

It will be observed that the bottom face 17 of the closure member 10 is in the form of a spherical cap so as to increase the lift effect of the fuel jet 18 delivered by the nozzle 11.

The force of the jet 18 is sufficient to press the closure member 10 against the edge of the orifice 16 so as to close it.

The duct 15 is thus isolated from the inside of the tank 2 so any droplets of fuel that may be splashed by waves of fuel sloshing in the tank while the vehicle is running are prevented from penetrating into the degassing circuit.

The fuel squirted against the bottom face 17 of the closure member 10 returns to the tank through the gaps 19 and the openings 13, as represented by arrows in FIG. 2.

In the event of the tank being accidentally turned upside-down, the closure member 10 closes the orifice 16 under the effect of its own weight.

It will be understood that the invention makes it possible to act on the closure member 10 from outside the tank 2 by switching the pump 3 on and off. This ensures that a force is applied to the closure member only when the engine is running.

This result can be achieved by other means without going beyond the ambit of the invention, and another embodiment of the invention is described below with reference to FIGS. 4 and 5.

In these figures, the same reference numerals are used as in FIGS. 1 and 3 to designate the same component parts, and they are not described again.

Figure 5:
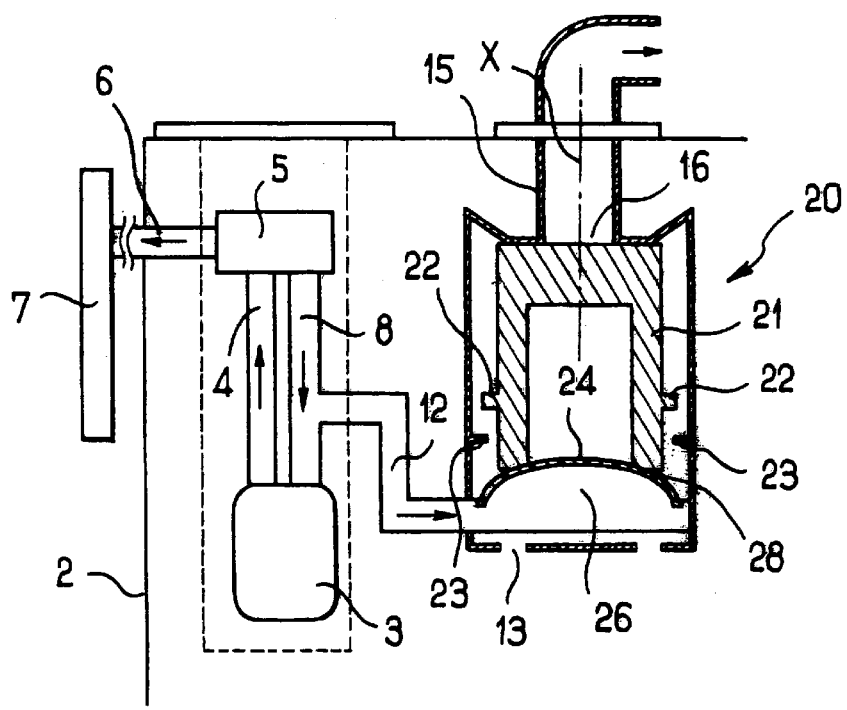
FIG. 5 shows the FIG. 4 valve while the engine is running.

The valve 20 shown in FIGS. 4 and 5 differs from the above-described valve 1 essentially by the means which are used for raising the closure member which is referenced 21.

In this case, the closure member 21 is in the form of a cylinder having a hollow interior over a fraction of its height from its bottom face, and having portions in relief 22 on the outside.

When the vehicle is at rest, these portions in relief 22 rest on supports 23 that project into the housing 9, and that leave gaps between one another like the above-described supports 14.

The valve 20 makes use of the pressure of the fuel in the duct 8, but the nozzle 11 of the above embodiment is replaced by a bag 26 whose top wall is constituted by a diaphragm 24 of deformable material.

The inside of the bag 26 communicates with the pipe 12 such that the diaphragm 24 tends to inflate under the pressure of the fuel returned via the duct 8 by the regulator 5 while the engine is running, as shown in FIG. 5.

The bag 26 also co-operates with the side wall 27 of the valve 20 to leave passages (not shown) enabling fuel vapor and air that penetrates via the openings 13 to reach the top portion of the valve 20 by flowing along passages that exist between the side wall 27 of the body of the valve 20 and the closure member 21.

The diaphragm 24 serves to modify the position of the closure member as a function of the state of the vehicle, i.e. in the example described as a function of whether or not the engine is running.

Openings 40 are made in the side wall 27.

When the engine is at rest, the closure member 21 has its bottom face 28 resting on the diaphragm 24 which is then plane and the portions in relief 22 bear against the supports 23.

The air and the fuel vapor present inside the tank can reach the inside of the valve 20 via the openings 13 and 40, pass along the passages that exist between the side wall 27 of the body of the valve 20 and the bag 26 and then the passages between the closure member 21 and the side wall 27 so as to end up by reaching the duct 15, as represented by arrows in FIG. 4.

It will be observed in this figure that the closure member 21 is far enough away from the orifice 16 at the beginning of filling to enable the tank to be ventilated effectively until the end of tank filling, as in the embodiment described above.

When the diaphragm 24 inflates under the effect of the pressure of the fuel contained in the duct 8, as shown in FIG. 5, the closure member 21 is pressed by the diaphragm 24 against the edge of the orifice 16 so as to close off access to the duct 15.

Two embodiments are described above with reference to FIGS. 1 to 5 in which the energy that enables the closure member to be held in its high, closing position when the engine is running comes from the pressure in the return circuit of the pump 3.

Naturally, it would not go beyond the ambit of the present invention to use the pressure in the go circuit 4 of the pump 3.

FIGS. 6 and 7 show a valve 30 constituting a third embodiment of the invention.

The valve 30 differs from the above-described valves 1 and 20 by the fact that electromagnetic means are implemented to bring the closure member into its position for closing the valve.

The valve 30 comprises a substantially tubular body 31 defining a housing 32 with the degassing duct 15 opening out into the top thereof via an orifice 16, like the embodiments described above.

The closure member that moves inside the body 31 is given reference 33 in this case.

The body 31 has openings 34 in its bottom portion and where appropriate in its side wall to allow the air contained in the tank to escape to the degassing duct when the valve is open.

At its top, the closure member 33 includes a magnetizable part constituted by a metal ring 36.

An assembly 37 constituted by a permanent magnet 37a with a coil 37b wound around it is fixed to the top portion of the body 31, as can be seen in FIGS. 6 to 8.

In the absence of electrical excitation of the coil, the permanent magnet 37a is capable of holding the ring 36 by magnetic attraction and consequently of holding the closure member 33 in its high position where it closes the valve.

The coil 37b can be excited to create a magnetic field opposite to that created by the permanent magnet 37a, thereby causing the metal ring 36 to cease to be attracted by the assembly 37 so that the closure member 33 then falls under gravity to its low, open position.

The coil 37b of the assembly 37 is connected by an electric cable 38 to a source of electricity situated outside the tank, e.g. the vehicle battery, via a switch and a pulse control device (not shown).

The switch can be operated by taking the cap off the tank when filling, thereby exciting the coil 37b of the assembly 37.

The length of time the coil 37b remains excited after the cap has been taken off the tank is controlled by the pulse control device and it can be relatively short, e.g. equal to 5 seconds.

All that is required is that this duration should enable the closure member 33 to separate from the permanent magnet 37a.

Once the closure member 33 has dropped into its low, open position, before the cap is put back into place, and after the excitation current to the coil 37 has been stopped, the permanent magnet 37a again creates an attractive magnetic field.

As the closure member 33 rises due to filling, it reaches a point where it comes close enough to the permanent magnet 37a to be attracted by the magnet into its high, closed position.

Because the coil is excited during a brief period only, its electricity consumption is relatively modest and does not give rise to any heating that could be prejudicial to the safety of the assembly.

Naturally, the invention is not limited to the embodiments described above.

In particular, springs can be added to the valves as described above in order to compensate for a fraction of the weight of the closure members.

Such springs are useful for ensuring that the degassing duct is closed in the event of the vehicle rolling onto its side.

What is claimed is:

1. In a motor vehicle, a fuel tank valve for connection to a degassing circuit, comprising:
   a movable closure member configured so as to float on the surface of the fuel, and
   means controlled from outside the tank to act on the closure member to bring it into a position in which the closure member closes permanently and at least partially the valve when the engine is running.

2. A valve according to claim 1, wherein said means brings the closure member into a position in which the closure member opens the valve when the tank is being filled.

3. A valve according to claim 1, wherein said means to act on the closure member makes use of the energy of a fuel pump.

4. A valve according to claim 1, wherein the closure member is configured to close off the degassing circuit in the event of the vehicle accidentally rolling over.

5. A fuel tank valve comprising:
a magnetizable movable closure member configured so as to float on the surface of the fuel, and
a coil being capable when electrically excited to bring the closure member into a predetermined position.

6. A valve according to claim 5, wherein said coil is electrically excited at the beginning of filling so as to create a magnetic field that tends to cancel the effects of a permanent magnet.

7. A valve according to claim 6, wherein in the absence of electrical excitation of the coil, the permanent magnet is configured to hold the closure member in a valve-closing position.

8. A valve according to claim 5, the vehicle comprising a filler cap, wherein the coil is caused to be excited by removing the filler cap from the tank.

9. A valve according to claim 5, wherein the closure member has a top portion including a magnetizable metal part.

10. A valve according to claim 9, wherein the top portion of the closure member includes a magnetizable metal ring.

11. A valve according to claim 6, wherein the coil is wound around the permanent magnet.

12. A valve according to claim 5, said vehicle having an engine, wherein said coil brings the closure member into a position in which the closure member closes the valve at least partially when the engine is running.

13. A valve according to claim 5, wherein said coil brings the closure member into a position in which the closure member opens the valve when the tank is being filled.

14. A valve according to claim 5, wherein the closure member is configured to close off the degassing circuit in the event of the vehicle accidentally rolling over.

15. A valve according to claim 5, wherein said coil is controlled from outside the tank.

16. In a degassing circuit, a fuel tank valve comprising:
a movable closure member, and
a nozzle for squirting a fuel jet under the closure member to bring it into a position in which the closure member closes the valve at least partially when the engine is running.

17. A valve according to claim 16, wherein the closure member has a concave bottom face against which the fuel jet is directed.

18. A valve according to claim 16, wherein said fuel jet brings the closure member into a position in which the closure member opens the valve when the tank is being filled.

19. A valve according to claim 16, wherein said fuel jet tends to bring the closure member into a position where it closes off an access to the degassing circuit.

20. A valve according to claim 16, wherein the closure member is configured so as to float on the surface of the fuel.

21. A valve according to claim 16, wherein the closure member is configured to close off the degassing circuit in the event of the vehicle accidentally rolling over.

22. A valve according to claim 16, wherein said nozzle is controlled from outside the tank.

23. A liquid fuel tank valve comprising:
a movable closure member, and
a diaphragm suitable for inflating under the effect of liquid fuel under pressure being delivered thereto, said liquid fuel under pressure coming in contact with the diaphragm, said diaphragm, on inflating, tending to bring the closure member into a predetermined position.

24. A valve according to claim 23, said vehicle having an engine, wherein said diaphragm brings the closure member into a position in which the closure member closes the valve at least partially when the engine is running.

25. A valve according to claim 23, wherein said diaphragm brings the closure member into a position in which the closure member opens the valve when the tank is being filled.

26. A valve according to claim 23, wherein the closure member is configured to close off the degassing circuit in the event of the vehicle accidentally rolling over.

27. A valve according to claim 23, wherein said diaphragm tends to bring the closure member into a position where it closes off an access to the degassing circuit.

28. A valve according to claim 23, wherein the closure member is configured so as to float on the surface of the fuel.

* * * * *